(12) United States Patent
Jones

(10) Patent No.: US 7,153,031 B2
(45) Date of Patent: Dec. 26, 2006

(54) BEARING ASSEMBLY WITH ANTI-SLIP SPRING

(75) Inventor: Patrick M. Jones, Kirkwood, MO (US)

(73) Assignee: Emerson Electric Co., St. Louis, MO (US)

( * ) Notice: Subject to any disclaimer, the term of this patent is extended or adjusted under 35 U.S.C. 154(b) by 74 days.

(21) Appl. No.: 10/854,814

(22) Filed: May 27, 2004

(65) Prior Publication Data

US 2005/0265645 A1    Dec. 1, 2005

(51) Int. Cl.
*F16C 19/06* (2006.01)

(52) U.S. Cl. ........................ 384/517; 384/906

(58) Field of Classification Search ............... 384/518, 384/517, 563, 906
See application file for complete search history.

(56) References Cited

U.S. PATENT DOCUMENTS

| | | | |
|---|---|---|---|
| 4,364,615 A * | 12/1982 | Euler | 384/517 |
| 4,647,230 A | 3/1987 | Friedrich et al. | |
| 4,719,352 A * | 1/1988 | Miyatake et al. | 384/518 |
| 5,125,755 A | 6/1992 | Adler et al. | |
| 5,577,847 A | 11/1996 | Nakamura et al. | |
| 5,800,122 A * | 9/1998 | Blattmann | 384/563 |
| 5,993,069 A | 11/1999 | Arrasmith et al. | |
| 6,123,462 A | 9/2000 | Crowell | |
| 6,270,260 B1 | 8/2001 | Hale | |
| 6,652,150 B1 | 11/2003 | Buchheim et al. | |
| 6,705,763 B1 | 3/2004 | Kamura et al. | |

FOREIGN PATENT DOCUMENTS

| | | |
|---|---|---|
| DE | 19843226 A1 | 3/2000 |
| EP | 0538529 A | 4/1993 |
| GB | 2058955 A | 4/1981 |

* cited by examiner

*Primary Examiner*—Lenard A. Footland
(74) *Attorney, Agent, or Firm*—Harness, Dickey & Pierce P.L.C.

(57) ABSTRACT

A bearing system which inhibits fretting to extend the life of a bearing. The system is usable in a machine, such as an electric motor, and includes an elastomeric spring positioned between the bearing and a bottom surface of a bore in which the bearing is received. The spring member applies force to the bearing in both an axial direction and a circumferential direction to oppose rotation of the bearing in the bore. The spring member has an annular shape with a plurality of circumferentially spaced teeth.

15 Claims, 3 Drawing Sheets

BEARING ASSEMBLY WITH ANTI-SLIP SPRING

BACKGROUND OF THE INVENTION

This invention relates generally to rolling bearings, and in particular to an elastomeric spring for a bearing assembly in an electric motor which inhibits fretting damage and extends the life of the bearing.

A substantial concern in machinery is fretting, which results from slight, micro-mechanical relative movements between tightly fitting parts which superficially appear immobile with respect to each other. Fretting is a combination of corrosion and abrasion which is frequently observed on equipment with moving or vibrating parts. If it continues, fretting can result in pitting and galling of contact surfaces, vibration, increased stress concentrations, and reduced life.

In an electric motor, fretting is a primary cause of bearing failure. As known to those skilled in the art, a motor has a rotatable assembly, or rotor, mounted within a hollow core of a stationary assembly, or stator, which holds windings of insulated wire. The motor transforms electrical energy into mechanical torque when the windings of the stator are energized with electrical current and interact with the rotor as it rotates. A rotatable shaft extends through the motor and is mounted on bearings located at front and back endshields on opposite longitudinal ends. A ball bearing, for example, has a cylindric outer surface and is received in a bore of the respective endshield. Unfortunately, the outer surface of the bearing is subject to rotate relative to the bore in which it is received. The bearing is typically sized with a clearance fit in the bore for ease of assembly and for avoiding radial loads on the bearing, but that decreases frictional resistance along the bearing's cylindric outer side and tends to facilitate relative movement. Even a bearing which is sized for a tight fit tends to become loose when ambient temperature varies because of differential thermal expansions between the bearing and endshield. As a result, slight relative movements occur between outer bearing surface and bore, which produce fretting damage.

Frequently, an annular-shaped steel washer is placed between the stationary end face of one bearing and a bottom shoulder of the corresponding bore to accommodate tolerance build-up and design clearances. The washer is not perfectly flat but has a "wavy" circumferential contour with several (e.g., three) high points which smoothly transition to intervening low points. When compressed between the bearing and end of the bore, the washer functions as a compression spring and applies reaction force to the bearing in the axial direction. The spring washer beneficially pushes the shaft and entire rotor assembly to a stable position to "preload" the rotor and reduce axial movement while accommodating component tolerances. Unfortunately, the washer does not provide significant resistance to rotation of the bearing. That limitation arises for at least two reasons. First, the contour of the washer provides only a small area of contact between the washer and the end face of the bearing, specifically at the three high points. Second, surface adhesion (i.e., friction coefficient) at the area of contact is relatively low because the materials in contact are both metallic. Thus, the bearing easily slips (rotates) on the spring washer.

As fretting continues, the bearing eventually moves in a radial direction, known to those skilled in the art as bearing creep, which causes the rotor to strike the stator. The entire motor must then be replaced. Several previous approaches for preventing rotation of the bearing have failed or required an additional insert or adhesive along the outer sides of the bearing, which increases complexity, degrades reliability, or makes assembly more difficult.

SUMMARY OF THE INVENTION

Among the several objects and features of exemplary embodiments of the present invention may be noted the provision of a bearing system which extends usable life; the provision of an exemplary bearing system which reduces fretting and bearing creep; the provision of an exemplary bearing system usable in an electric motor; the provision of an exemplary bearing system which is easily assembled; the provision of an exemplary bearing system which is reliable in operation; the provision of an exemplary bearing system which inhibits vibration and reduces noise levels; and the provision of an exemplary bearing system which is economical to produce.

In general, a bearing system according to the present invention comprises a bearing housing including a bore aligned along a longitudinal axis. The bore has a cylindric inner side wall and a bottom surface within the bore which defines an end of the bore. A bearing is received in the bore of the housing which is configured for rotatably supporting a shaft. The bearing has a cylindric outer side adjacent to the inner side wall of the bore and an end face located generally adjacent the bottom surface of the bore. An anti-slip spring member is received in the bore and interposed between the end face of the bearing and the bottom surface of the bore. The anti-slip spring member is configured to apply force to the end face of the bearing in a generally axial direction when the spring member is compressed between the bearing and the end of the bore, and further configured to apply force to the end face of the bearing in a direction parallel to the end face in opposition to any rotational movement of the bearing relative to the bore, such that the anti-slip spring member urges the bearing to remain at a fixed rotational position in the bore to prevent movement of the outer side of the bearing relative to the inner side wall of the bore.

In another aspect, a dynamoelectric machine according to the present invention comprises a stator having a longitudinal axis, and a rotor mounted for rotation relative to the stator to interact magnetically with the stator. The rotor includes a shaft extending along the axis. Two endshields are for connection at opposite longitudinal ends of the stator, at least one of the endshields having a bore with a bottom surface. A bearing is received in the bore for supporting the shaft. A spring member is positioned between the bearing and the bottom surface of the bore. The spring member is formed of an elastomeric material.

Other objects and features of the present invention will be in part apparent and in part pointed out hereinafter.

DETAILED DESCRIPTION OF THE PREFERRED EMBODIMENT

Figure 1:
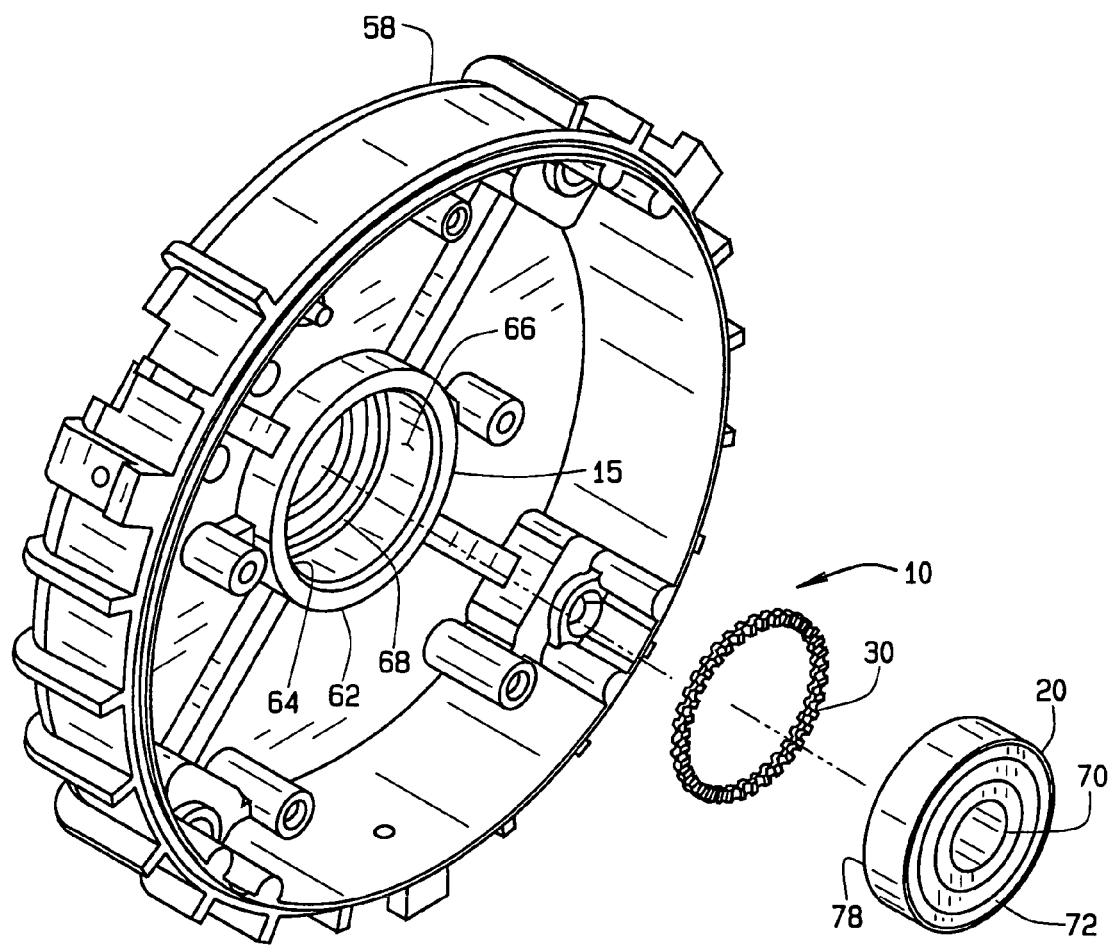
FIG. 1 is an exploded perspective of one embodiment of a bearing system according to the present invention.

Referring now to the drawings and in particular to FIG. 1, a bearing system according to one embodiment of the present invention is indicated generally at 10. The bearing system 10 includes a bearing housing 15, a bearing 20 receivable in the housing, and an anti-slip spring member 30 which inhibits rotation of the bearing in the housing and reduces damage due to fretting. In one embodiment, the bearing system 10 is intended for installation in a dynamoelectric machine, such as an electric motor 40 (FIG. 5) or a generator. Although the description herein is primarily with reference to that embodiment, it is understood that the bearing system has wide application and may be used with other devices, machinery, or equipment in other fields of industry without departing from the scope of this invention.

Figure 5:
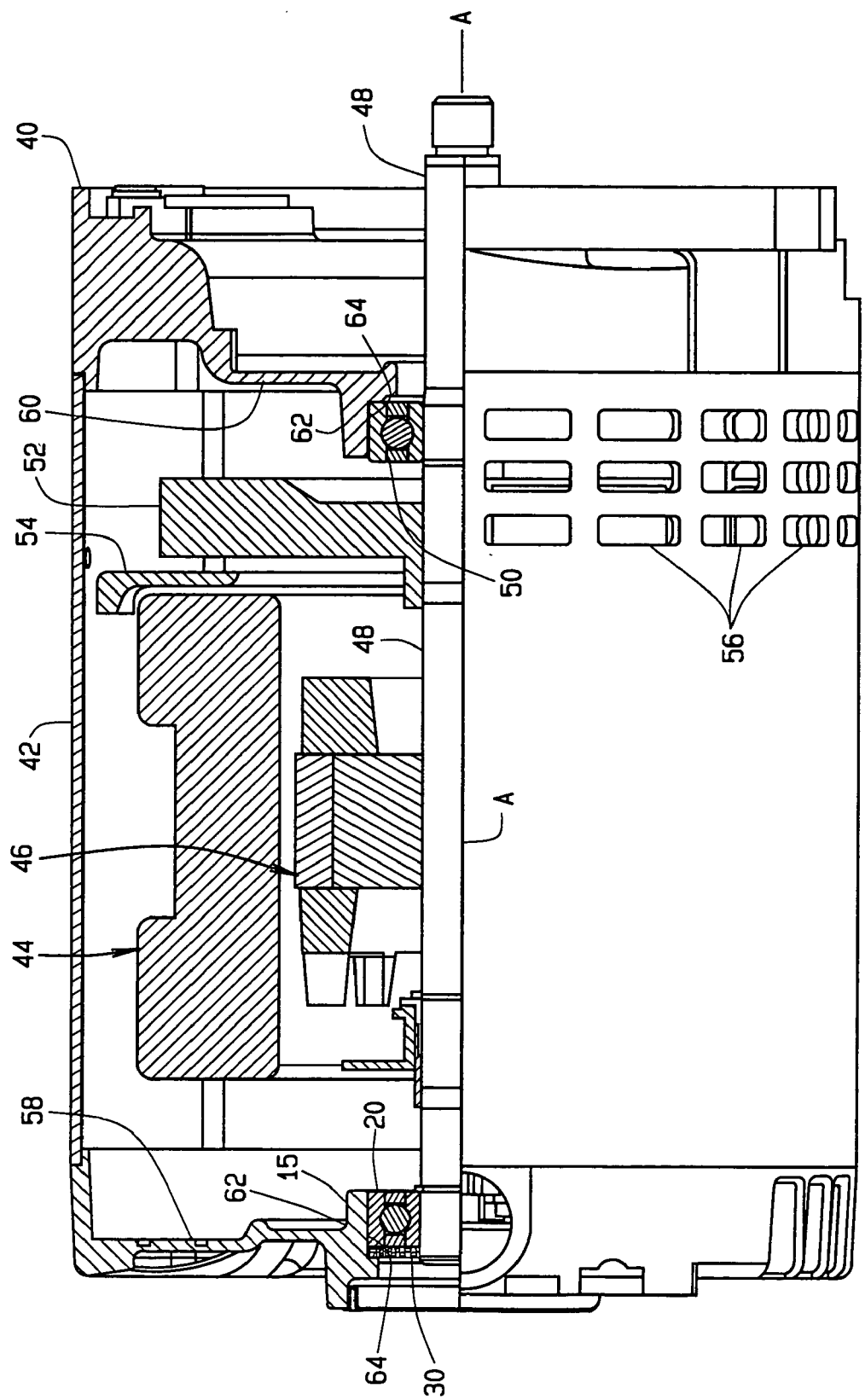
FIG. 5 is a side elevation, partially in section, of an electric motor incorporating the bearing system.

Referring to FIG. 5, the electric motor 40 includes a casing 42 having a hollow interior. A stationary assembly or stator (generally designated 44) and a rotatable assembly or rotor (generally designated 46) magnetically coupled to the stator are both positioned within the casing. As is known in the art, the stator 44 holds one or more wire-wound coils, or windings (not shown), on a core. The windings are energized with electrical current, causing the stator 44 to magnetically interact with the rotor 46 as it rotates. The rotor 46 is rotatable about a shaft 48 which extends along a central longitudinal axis A and is mounted in the machine on two bearings, including the front bearing 20 and a back bearing 50. The stator 44 and rotor 46 are coaxially aligned, generally along the axis A. Many aspects of the stator and rotor are conventional and will not be described in further detail. A ventilation system for cooling the motor 40 includes a fan 52 and a baffle 54 for directing a flow of air through the casing 42 to cool component parts. A plurality of vent openings 56 extend through the side of the casing for exhaust of cooling air out from the interior of the casing.

Figure 6:
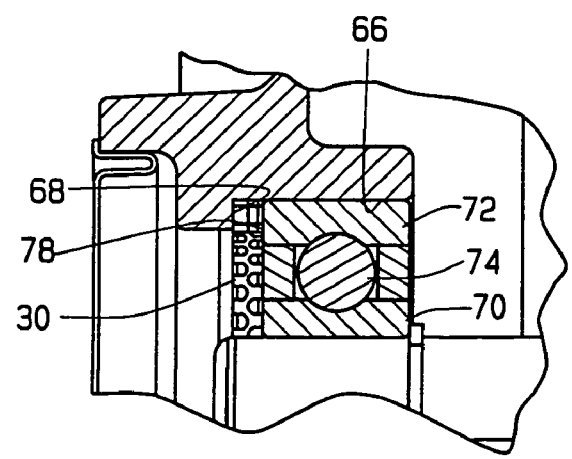
FIG. 6 is an enlarged fragment of FIG. 5.

A front endshield 58 and a back endshield 60 are positioned at opposite longitudinal ends of the motor 40. The endshields 58, 60 are connected by several (e.g., three) circumferentially spaced bolt fasteners (not shown) which are received through corresponding bores on each endshield. Each endshield includes a central hub 62 containing a bore 64 for receiving a respective bearing 20, 50. The bores 64 are aligned along the central axis A, and each has a cylindric inner side wall 66 (FIG. 6). In one embodiment, a shoulder 68 (FIGS. 1 and 6) within each bore 64 defines a bottom surface which is a seat for the bearing. It is understood the bearing seat may have other configurations, e.g., a flat closed end wall at one end of the bore. The bearing seat may be located anywhere along the central axis A of the endshield without departing from the scope of this invention. The bearing system 10 may be used in combination with a different type of bearing (e.g. a journal bearing) to complete the rotor bearing system.

A bearing system 10 of the present invention may be used at one or both ends of the motor 40. As shown in the drawings and hereinafter described, the bearing system is incorporated only in one endshield at one end of the motor, i.e., the front endshield 58. The hub 62 of the front endshield 58 comprises the aforementioned bearing housing 15, and it holds the bearing 20 for rotatably supporting the shaft 48. As shown in FIGS. 1 and 6, the bearing 20 includes an inner ring, or race 70, and a concentric outer ring, or race 72, which are configured for relative rotation with relatively low friction by the provision of several spherical balls 74 positioned between the races. The inner race 70 of the bearing is coupled to the shaft 48 and rotates with the shaft, whereas the outer race 72 is coupled to the hub 62 and should not rotate. The outer race 72 has a cylindric outer surface or side 76 which is positioned adjacent to the inner side wall 66 of the bore. An end face 78 of the bearing 20 faces toward the shoulder 68 (or bottom surface) of the bore and is located generally adjacent the bottom surface. It is understood that the bearing can be of a different type without departing from the scope of this invention.

Figure 2:
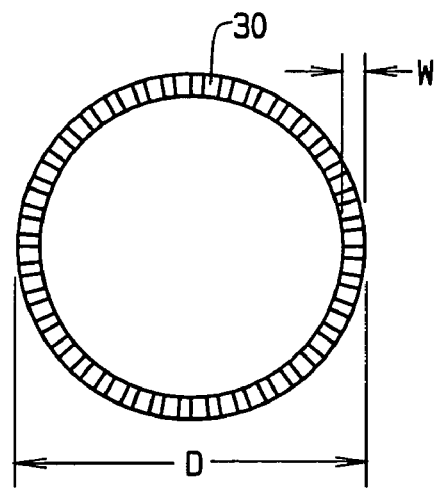
FIG. 2 is a front elevation of an anti-slip spring member.
Figure 3:
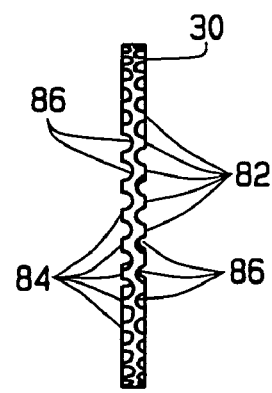
FIG. 3 is a side elevation of the anti-slip spring member of FIG. 2.

The anti-slip spring member 30 is received in the bore 64 at a position interposed between the end face 78 of the bearing and the shoulder 68 or bottom surface of the bore. In one embodiment, the anti-slip spring member 30 has a one-piece, continuous, and annular shape as shown in FIGS. 2 and 3. It has an outside diameter D corresponding with the shoulder 68 and a width W about equal to the width of the shoulder. It is understood that the spring member may have other shapes or sizes, including a discontinuous or multi-part design, without departing from the scope of this invention.

The spring member 30 is configured to apply force to the end face 78 of the bearing 20 in at least two directions. First, it provides force in a generally axial direction when the spring member 30 is compressed between the bearing 20 and the bottom surface 68 of the bore. This axial force pushes the rotor assembly 46 to a stable position in the casing 42 and prevents vibrations and noise during operation of the motor 40. Second, the spring member 30 provides force in a circumferential direction, parallel the end face 78, to oppose any rotational movement of the outer race 72 of the bearing relative to the bore 64. This force is provided by static friction between the spring member and adjacent surfaces, as well as by the compression of the spring member and its construction with segments having a circumferential component, as discussed below. Thus the spring member 30 provides frictional resistance to rotational movement of the outer race 72 of the bearing 20 in the housing 15.

The anti-slip spring member 30 is formed of a suitable elastic and resilient material which provides good surface adhesion against the bearing. Preferably, the material is also durable in a high pressure and temperature environment, injection moldable, and recyclable. Exemplary materials are rubber, a poured urethane, and a thermoplastic elastomer such as SANTOPRENE® (a registered trademark of Advanced Elastomer Systems of Akron, Ohio). The material compresses when pressed between the bearing 20 and bottom surface 68 of the bore, and the spring member 30 applies a reaction force corresponding to its deflection from an unloaded state. For opposing rotation, the material also preferably provides good surface adhesion (i.e., static friction) against metal surfaces, such as the typically steel end face 78 of the bearing 20 and bottom surface 68 of the bore. Consequently, the material does not easily slide along these surfaces, and the force provided by the elastomeric spring member 30 in opposing rotation of the outer race of bearing 20 exceeds that provided by a metallic washer of the prior art.

In one embodiment, the spring member 30 has a plurality of circumferentially spaced engagement regions in the form of teeth having flat contact surfaces 80. The teeth include a first set of teeth (each tooth being indicated at 82) and a second set of teeth (each tooth being indicated at 84). The first and second sets of teeth face in opposite directions for respective engagement with the end face 78 of the bearing 20 and the bottom surface (or shoulder) 68 of the bore. The teeth 82, 84 of each set are separated by recesses 86, which are illustrated as having smoothly contoured edges and being generally U-shaped. However, the recesses 86 may have other shapes including non-smooth contours. The first and second sets of teeth are circumferentially arranged in an alternating pattern around the spring member 30, i.e., the teeth 82 of the first set are circumferentially offset from the teeth 84 of the second set such that the teeth of one set are generally aligned with the recesses 86 between the teeth of the other set. In the embodiment shown in the drawings, there are thirty-six first teeth 82 and thirty-six second teeth 84 on the spring member 30. The flat contact surfaces 80 provide for effective engagement, with total area of engagement between the teeth 82 and end face 78, as well as between the teeth 84 and bottom surface 68, being significantly larger than similar areas of contact provided by a metallic washer of the prior art. Unlike a "wavy" metallic washer of the prior art which contacts a bearing at a relatively small area or at a few points, the teeth 82, 84 of the spring member 30 provide an area of contact at many points over a relatively large area around the bearing. In one embodiment, the area of contact with the end face 78 of the bearing (i.e., aggregated contact surface areas of all teeth 82 of the first set) is about 50% of the area of a face of the spring member 30. It is understood that the spring member 30 may have a different configuration, including a smooth o-ring design or a different number or arrangement of engagement regions, without departing from the scope of the present invention.

Figure 4:
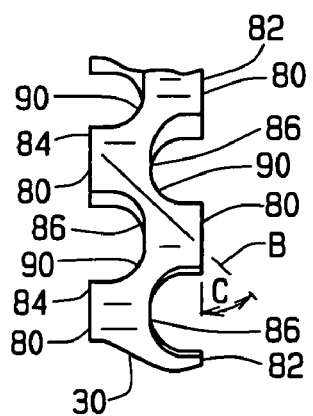
FIG. 4 is an enlarged fragment of FIG. 3.

The spring member 30 is configured to oppose rotational movement of the bearing 20, in particular, its outer race 72. As shown in FIG. 4, a portion of the spring member 30 which connects each pair of adjacent teeth defines a connecting segment 90 which is disposed between each tooth 82 of the first set of teeth and adjacent tooth 84 of the second set of teeth. In one embodiment, each connecting segment 90 has a relatively narrow region positioned between opposing recesses 86. Each connecting segment 90 has a generally central axis B which slopes at an angle C relative to the contact surfaces 80. Thus, each connecting segment 90 has directional components both in the axial direction and the circumferential direction. If the bearing 20 should begin to rotate, a first tooth 82 moves circumferentially relative to an adjacent second tooth 84. Because the connecting segments 90 extend with a circumferential component of direction, they are placed in either tension or compression, thereby generating force which augments frictional resistance to rotation. In one embodiment, the angle C is less than 80 degrees and more preferably about 45 degrees. Connecting segments of other shapes do not depart from the scope of this invention.

Thus the spring member 30 constrains the bearing 20 to remain at a fixed rotational position in the bore 64, preventing movement of the outer race 72 relative to the bore. Both the geometrical construction and the material forming the spring member 30 contribute to its capabilities in applying force in two (axial and circumferential) directions. It is understood that a spring member in which only one of its geometrical construction or its material provide these advantages does not depart from the scope of this invention. For example, a spring member having a geometry identical to the spring member 30 shown in the drawings but which is formed of a metal such as steel would provide both axial and circumferential forces. The recesses 86 and offset sets of teeth 82, 84 allow for its compression. Similarly, a spring member having the geometry of a toroidal o-ring (with no recesses nor teeth) but which is formed of an elastomeric material would also provide axial and circumferential forces.

Significantly, the provision of the spring member 30 of the present invention permits the bearing 20 to be sized for being received in the bore 64 with a slip (clearance) fit. It avoids the need for an interference fit to hold the bearing 20 tightly in the bore, which would produce radial loads on the bearing which are detrimental to the operation of the bearing. Further, the spring member 30 permits the outer axial side 76 or surface of the bearing to be placed directly adjacent the inner side wall 66 of the bore. It avoids the need for any intervening member positioned between the outer side 76 and inner side wall 66 to prevent fretting, such as an insert, tolerance ring, or adhesive, which would increase complexity, degrade reliability, or make assembly more difficult.

The spring member 30 described above may be manufactured in a conventional, low cost injection molding process. During assembly, the spring member 30 can be simply inserted into the bore 64 prior to installation of the bearing. The spring member 30 is a direct substitute for a metallic "wavy" washer of the prior art, and may be a replacement for a metallic spring in motors being reconditioned. In this regard, the elastomeric material and geometric configuration of the spring member 30 may be selected to closely approximate the axial loading characteristics (i.e, the "spring constant") of a particular metallic washer design.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A bearing system comprising:
    a bearing housing including a bore aligned along a longitudinal axis, the bore having a cylindric inner side wall and a bottom surface within the bore which defines an end of the bore;
    a bearing received in the bore of the housing which is configured for rotatably supporting a shaft, the bearing having a cylindric outer side adjacent to the inner side wall of the bore and an end face located generally adjacent the bottom surface of the bore; and
    an anti-slip spring member received in the bore and interposed between the end face of the bearing and the bottom surface of the bore, the anti-slip spring member including a plurality of circumferentially spaced resilient teeth, the plurality of circumferentially spaced resilient teeth engaging at least the end face of the bearing and configured to apply force to the end face of the bearing in a generally axial direction when the spring member is compressed between the bearing and the end of the bore, and further configured to apply force to the end face of the bearing in a direction parallel to the end face in opposition to any rotational movement of the bearing relative to the bore, such that the anti-slip spring member urges the bearing to remain at a fixed rotational position in the bore to prevent movement of the outer side of the bearing relative to the inner side wall of the bore.

2. A bearing system as set forth in claim 1 wherein the anti-slip spring member is elastic.

3. A bearing system as set fourth in claim 2 wherein the anti-slip spring member is formed of an elastomeric material.

4. A bearing system as set forth in claim 2 wherein the anti-slip spring member has an annular shape.

5. A bearing system as set forth in claim 4 wherein said resilient teeth on the anti-slip member comprise first and second sets of resilient teeth which face in opposite directions for respective engagement with the end face of the bearing and the bottom surface of the bore.

6. A bearing system as set forth in claim 5 wherein each of said resilient teeth have a flat engagement surface.

7. A bearing system as set forth in claim 5 wherein the resilient teeth of the first and second sets are circumferentially arranged in an alternating pattern along the anti-slip spring member.

8. A bearing system as set forth in claim 7 further comprising a connecting segment between each adjacent pair of first and second resilient teeth, each connecting segment having a circumferential component of direction.

9. A bearing system as set forth in claim 1 wherein the bearing is sized for being received in the bore with a clearance fit.

10. A bearing system as set forth in claim 9 wherein the outer side of the bearing is directly adjacent the inner side wall of the bore without any intervening member positioned therebetween.

11. A dynamoelectric machine comprising:

a stator having a longitudinal axis;

a rotor mounted for rotation relative to the stator to interact magnetically with the stator, the rotor including a shaft extending along the axis;

two endshields for connection at opposite longitudinal ends of the stator, at least one of the endshields having a bore with a bottom surface;

a bearing received in said bore for supporting the shaft; and a spring member positioned between the bearing and the bottom surface of the bore;

wherein the spring member is formed of an elastomeric material and comprises a plurality of circumferentially spaced resilient teeth, the plurality of circumferentially spaced resilient teeth engaging the bearing.

12. A dynamoelectric machine as set forth in claim 11 wherein the spring member has an annular shape.

13. A dynamoelectric machine as set forth in claim 12 wherein said resilient teeth on the spring member comprise first and second sets of resilient teeth which face in opposite directions for respective engagement with the bearing and the bottom surface of the bore.

14. A dynamoelectric machine as set forth in claim 13 wherein each of said resilient teeth have a flat engagement surface.

15. A dynamoelectric machine as set forth in claim 13 wherein the resilient teeth of the first and second sets are circumferentially arranged in an alternating pattern along the spring member.

\* \* \* \* \*